United States Patent
Ee et al.

(10) Patent No.: US 11,915,721 B2
(45) Date of Patent: Feb. 27, 2024

(54) MOUNT PLATE WITH SUSPENSION CIRCUIT INDENTATIONS

(71) Applicant: Magnecomp Corporation, Murrieta, CA (US)

(72) Inventors: Kuen Chee Ee, Chino, CA (US); Long Zhang, Winchester, CA (US); David Glaess, Bangkok (TH)

(73) Assignee: Magnecomp Corporation, Murrieta, CA (US)

(*) Notice: Subject to any disclaimer, the term of this patent is extended or adjusted under 35 U.S.C. 154(b) by 0 days.

(21) Appl. No.: 18/111,402

(22) Filed: Feb. 17, 2023

(65) Prior Publication Data
US 2023/0267962 A1 Aug. 24, 2023

Related U.S. Application Data

(60) Provisional application No. 63/312,708, filed on Feb. 22, 2022.

(51) Int. Cl.
| | |
|---|---|
| *G11B 5/48* | (2006.01) |
| *G11B 5/596* | (2006.01) |
| *G11B 21/02* | (2006.01) |
| *G11B 21/16* | (2006.01) |

(52) U.S. Cl.
CPC ............ *G11B 21/025* (2013.01); *G11B 21/16* (2013.01)

(58) Field of Classification Search
CPC ..... G11B 5/4826; G11B 5/4833; G11B 5/596; G11B 5/4853; G11B 5/4873; G11B 5/486; G11B 7/22; G11B 5/59633; H05K 3/385; H05K 7/056
USPC .............. 360/245.1, 245.9, 245.8, 245.6
See application file for complete search history.

(56) References Cited

U.S. PATENT DOCUMENTS

| | | | |
|---|---|---|---|
| 5,299,081 A | 3/1994 | Hatch et al. | |
| 6,751,066 B1 | 6/2004 | Warmka et al. | |
| 6,765,760 B2 | 7/2004 | Saito et al. | |
| 7,688,549 B2 | 3/2010 | Watadani et al. | |
| 7,898,770 B1 | 3/2011 | Zhang et al. | |
| 8,929,032 B2 | 1/2015 | Greminger et al. | |
| 8,929,033 B2 * | 1/2015 | Shum .................. | G11B 5/4833 360/245.9 |
| 9,165,578 B2 | 10/2015 | Dexter et al. | |
| 2007/0115590 A1 | 5/2007 | Resh et al. | |

OTHER PUBLICATIONS

International Search Report and Written Opinion in International Application No. PCT/US2023/013603, dated May 26, 2023.

* cited by examiner

*Primary Examiner* — Nabil Z Hindi
(74) *Attorney, Agent, or Firm* — DLA Piper LLP (US)

(57) ABSTRACT

A hard disk drive (HDD) includes a suspension connected to a stack arm. The suspension includes a mount plate, a hinge, a load beam, and a circuit. The mount plate includes a bottom surface facing a disk and an ear portion extending from a side edge of the mount plate. The bottom surface includes a planar region, a first indented region vertically recessed relative to the planar region, and a second indented region located at the ear portion and vertically recessed relative to the planar region. The load beam terminates in a load beam hinge is connected to the first indented region. The circuit extends along the first and second indented regions.

20 Claims, 5 Drawing Sheets

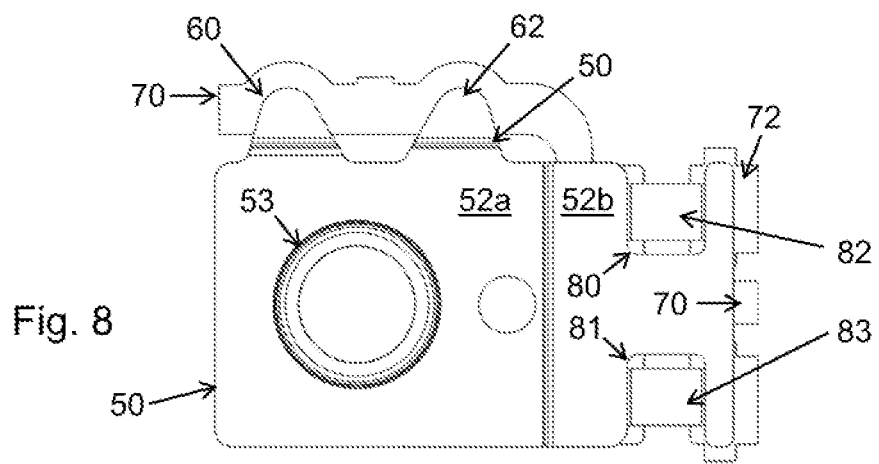
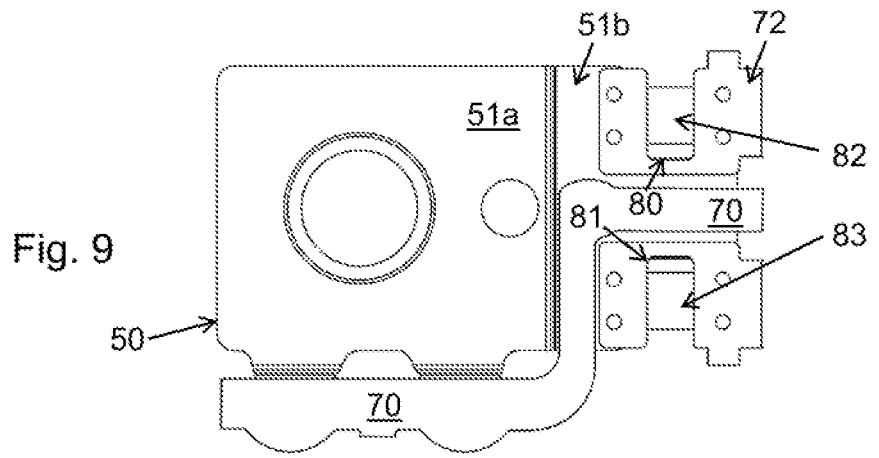

MOUNT PLATE WITH SUSPENSION CIRCUIT INDENTATIONS

CROSS-REFERENCE TO RELATED APPLICATIONS

This application claims the benefit of, and priority to, U.S. Provisional Application No. 63/312,708 filed on Feb. 22, 2022, which is hereby incorporated by reference in its entirety.

FIELD

The present disclosure relates generally to improved hard disk drive assemblies with improved suspension-to-disk clearances and specifically to a mount plate with enhanced features that shift the suspension circuit in a vertical direction, for improved suspension-to-disk clearances.

BACKGROUND

Increasing storage capacity is a goal in the data storage industry. Data storage products such as magnetic disk drives and optical disk drives, store digital information on rotating disks using a read/write head. The information is typically recorded in concentric, circumferential tracks about the near-center of the disk.

FIG. 1 illustrates a conventional hard disk drive (HDD) assembly 10 with a pair of adjacent suspensions 12A, 12B on either side of a disk 14 configured to rotate between the suspensions 12A, 12B. While two suspensions on both sides of a single disk are shown, it should be understood that multiple disks and corresponding suspensions may be included in a single disk drive. The configuration of suspension 12A (which faces the top surface of disk 14) is described below, but it should be understood that suspension 12B has the same configuration as suspension 12A, but suspension 12B faces the bottom surface of disk 14.

Suspension 12A includes a gimbal portion 16 (also referred to as a gimbal tongue) with a slider 18 that has a read/write head for writing digital information to, and reading digital information from, the disk 14. The slider 18 is mounted onto gimbal portion 16 which is in contact with the dimple point of a load beam 20 that terminates at its other end in a hinge 22. Hinge 22 connects load beam 20 to a mount plate 24, where hinge 22 allows for vertical flexing of the load beam 20 relative to the mount plate 24. Mount plate 24 is connected to a stack arm 26, preferably by swaging a cylindrical boss 28 of the mount plate 24 in a mounting hole 30 of the stack arm 26.

The disk drive uses a servo-controlled actuator to position the read/write head of the slider 18 on a desired track of the disk 14, by horizontally rotating stack arm 26. The actuator moves the read/write head from one track to another in a process called seek. It also maintains the read/write head's position on a desired track in a process called track following. For example, a voice coil motor (VCM) can be used to actuate head positioning by manipulating the rotational positioning of the stack arm 26. As track density increases, VCM actuators have limitations in resolution and frequency response. To increase storage capacity and increase track density, dual stage or triple stage actuators are being developed. The triple stage actuators use a VCM for seeking and coarse track following, and use milli-actuators on the mount plate 24 and micro-actuators on the gimbal portion 16 where the slider 18 is assembled for fine track positioning.

Electrical signals are conveyed to and from the slider by a suspension circuit 32 of wires or conductive traces that extend from the slider 18, along the load beam 20, along the mount plate 24 and to the stack arm 26. To best access the slider 18 (which is mounted on the gimbal portion 16), circuit 32 extends along the bottom surfaces of load beam 20, hinge 22 and mount plate 24, as shown in FIGS. 1 and 2.

There are several suspension-to-disk clearances of interest which are illustrated in FIG. 1. A first suspension-to-disk clearance A is defined as the distance between a distal end portion 34 of the suspension 12A and the upper surface of disk 14. The distal end portion 34 is a non-fixed end of suspension 12A, which is made of relatively thin semi-rigid materials such as stainless steel. The clearance location A is critical to ensure proper contact of distal end portion 34 to a ramp when the suspension is parked on the ramp during non-operational state.

The second suspension-to-disk clearance B is defined as the distance between that portion of the circuit 32 extending along the bottom surface of load beam 20 which is closest to the disk 14 and the upper surface of the disk 14. While this portion of the circuit 32 is located toward the center of load beam 20, it can be susceptible to undesired contact with the rotating disk 14 due to the shape of the load beam 20 and undesired vertical displacement of that portion of suspension 12A during a shock impact at clearance location B.

The third suspension-to-disk clearance C is defined as the distance between that portion of the circuit 32 extending along the bottom surface of mount plate 24 and the upper surface of the disk 14. This region of the suspension 12A may be referred to as the mount plate region. The mount plate 24 has a bottom surface that is generally planar (except for the cylindrical boss 28). During a shock impact that causes the suspension 12A to bend significantly, the portion of circuit 32 extending along the bottom surface of mount plate 24 can be susceptible to undesired contact with the rotating disk 14 at clearance location C.

Under shock impacts, if the circuit 32 on the bottom of suspension 12A makes contact with the disk 14, it can cause the HDD assembly 10 to fail. Therefore, the clearances B and C should be high enough to prevent such contact. However, there are countervailing efforts to reduce the above clearances B, and C in the HDD assembly. Specifically, there is a demand for increasing the storage capacity of the HDD assembly 10, which includes placing more disks 14 and corresponding suspensions 12A/12B into the HDD assembly 10. However, the thickness of the HDD assembly 10 is typically fixed due to the replacement requirement of the existing drive stack. Therefore, there is a need to make the suspension 12A as thin as possible while maintaining the minimum clearances A, B, and C necessary for reliable operation even in the event of a shock event.

SUMMARY

In some embodiments a suspension is disclosed. The suspension includes a mount plate terminating in a load beam hinge, a load arm, and a circuit. The mount plate includes a bottom surface facing the disk and an ear portion extending from a side edge of the mount plate. The bottom surface includes a planar region, a first indented region vertically recessed relative to the planar region, and a second indented region located at the ear portion and vertically recessed relative to the planar region. The load beam hinge is connected to the first indented region. A circuit extends along the first and second indented regions.

In another aspect, a hard disk drive (HDD) assembly is disclosed. The HDD assembly includes a disk configured to rotate, a stack arm, and a suspension connected to the stack arm. The suspension may include a mount plate connected to the stack arm, wherein the mount plate includes a bottom surface facing the disk and an ear portion extending from a side edge of the mount plate, The bottom surface includes: a planar region, a first indented region vertically recessed relative to the planar region, and a second indented region located at the ear portion and vertically recessed relative to the planar region. A load beam hinge may be connected to the first indented region. A circuit extends along the first and second indented regions.

Other features and advantages of examples of the present disclosure will be apparent from the accompanying drawings and from the detailed description that follows.

BRIEF DESCRIPTION OF THE DRAWINGS

Examples of the present disclosure are illustrated by way of example and not limitation in the figures of the accompanying drawings, in which like references indicate similar elements and in which:

FIG. 8 is a top view of a mount plate region of a suspension of a head stack assembly, according to an alternative example of the disclosure; and FIG. 9 is a bottom view of the mount plate region of the suspension of the head stack assembly of FIG. 8.

DETAILED DESCRIPTION

Figure 3:
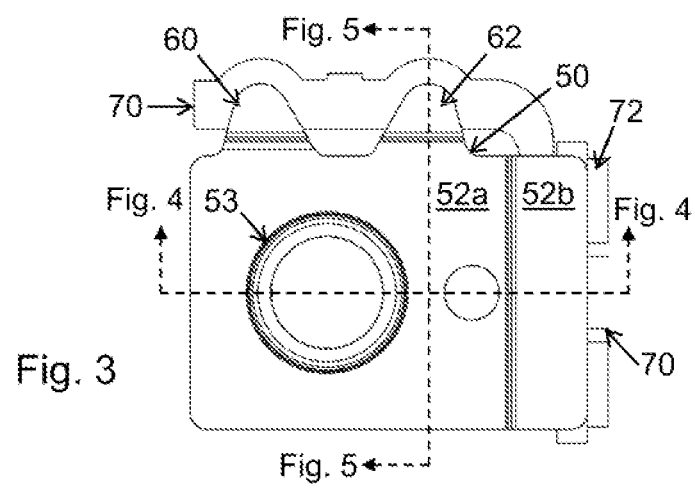
FIG. 3 is a top view of a mount plate region of a suspension of a head stack assembly, according to an example of the disclosure.
Figure 6:
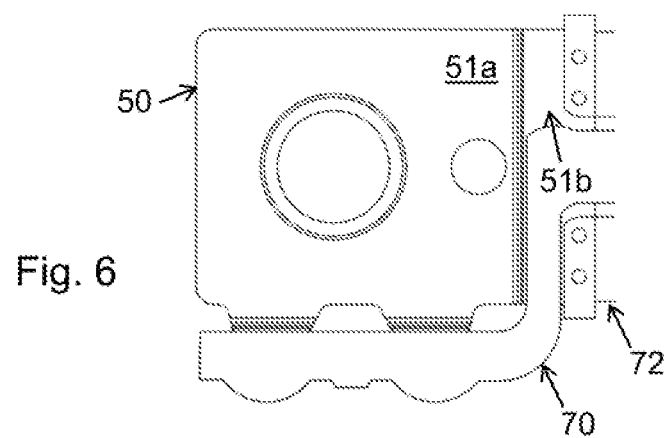
FIG. 6 is a bottom view of the mount plate region of a suspension of a head stack assembly shown in FIG. 3.

FIG. 3 is a top view of the mount plate region of a hard disk drive (HDD) suspension, with a mount plate 50 attached to a stack arm 54 via cylindrical boss 53 (of the mount plate 50) swaged in a mounting hole of the stack arm 54. The mount plate 50 may be manufactured from planar stainless-steel sheets that are subsequently chemically etched to almost any two-dimensional design within the limitations of process tolerances. The flat patterned stainless-steel sheets are then formed into desired three-dimensional shapes as described below. The present disclosure makes use of said design features that can be routinely and precisely fabricated.

Figure 4:
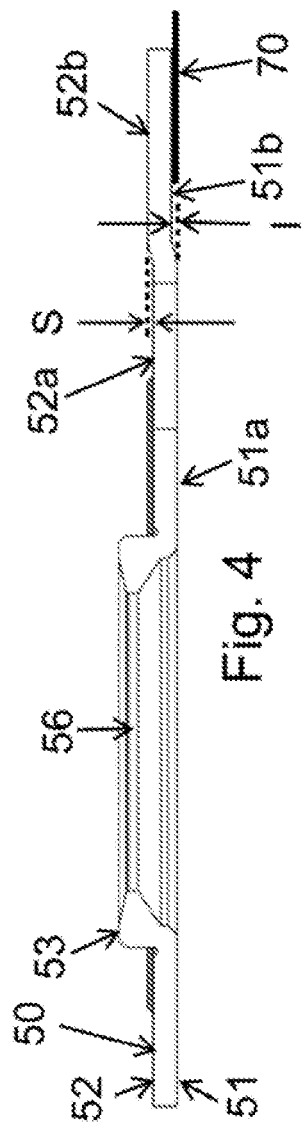
FIG. 4 is a side cross-sectional view of the mount plate region of FIG. 3, taken along dotted line in FIG. 3 labeled FIG. 4.

The mount plate 50 has a bottom surface 51 having a generally planar region 51a and an indented region 51b (also referred to herein as a first indented region) that is vertically recessed relative to the planar region 51a. For example, the indented region 51b can be planar and be parallel to, but offset by an amount of indentation I relative to, the planar region 51a of the bottom surface 51. The amount of indentation I can be approximately 0.030-0.0345 mm, which is equivalent to the thickness of the load beam or the circuit 70 (described below). The indented region 51b can be created by mechanical stamping, jog forming techniques, and/or chemical etching, which can create a corresponding stepped region 52b of the top surface 52 of the mount plate 50 that is vertically protruding relative to the planar region 52a of the top surface 52. The amount of step S can be equal to the amount of indention I, as best shown in FIG. 4 (side cross sectional view of mount plate 50 along dotted line in FIG. 3 labeled FIG. 4).

Figure 5:
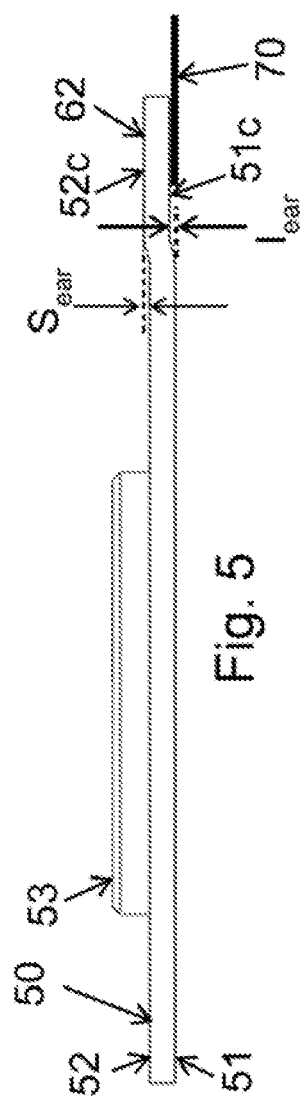
FIG. 5 is a side cross-sectional view of the mount plate region of FIG. 3, taken along dotted line in FIG. 3 labeled FIG. 5.

The mount plate 50 further includes first ear portion 60 and second ear portion 62 extending from a side edge of mount plate 50. First and second ear portions 60, 62 have indented regions 51c (also referred to herein as second indented regions) of the bottom surface 51 which are indented (vertically recessed) by an amount of indentation $I_{ear}$ relative to the planar region 51a of bottom surface 51, and have stepped regions 52c of the top surface 52 which are stepped by an amount of step $S_{ear}$ relative to the planar region 52a of top surface 52, as best shown in FIG. 5 (side cross sectional view of mount plate 50 along dotted line in FIG. 3 labeled FIG. 5). The indented regions 51c can be planar and be parallel to, but offset by an amount of indentation $I_{ear}$ relative to, the planar region 51a of the mount plate bottom surface 51. The same mechanical stamping, jog forming techniques, and/or chemical etching can be used to form indented region 51b and indented regions 51c. Therefore, the amount of indentation $I_{ear}$ for indented regions 51c can be the same as the amount of indentation I for the indented region 51b, and the amount of step $S_{ear}$ for the stepped regions 52c can be the same as the amount of step S for the stepped region 52b. Additionally, the amount of indentation $I_{ear}$ for indented regions 51c can be less than the amount of indentation I for the indented region 51b, and the amount of step $S_{ear}$ for the stepped regions 52c can be less than the amount of step S for the stepped region 52b. While two mount ear portions 60, 62 are shown, a single mount ear portion, or more than two mount ear portions, can instead be included.

Figure 1:
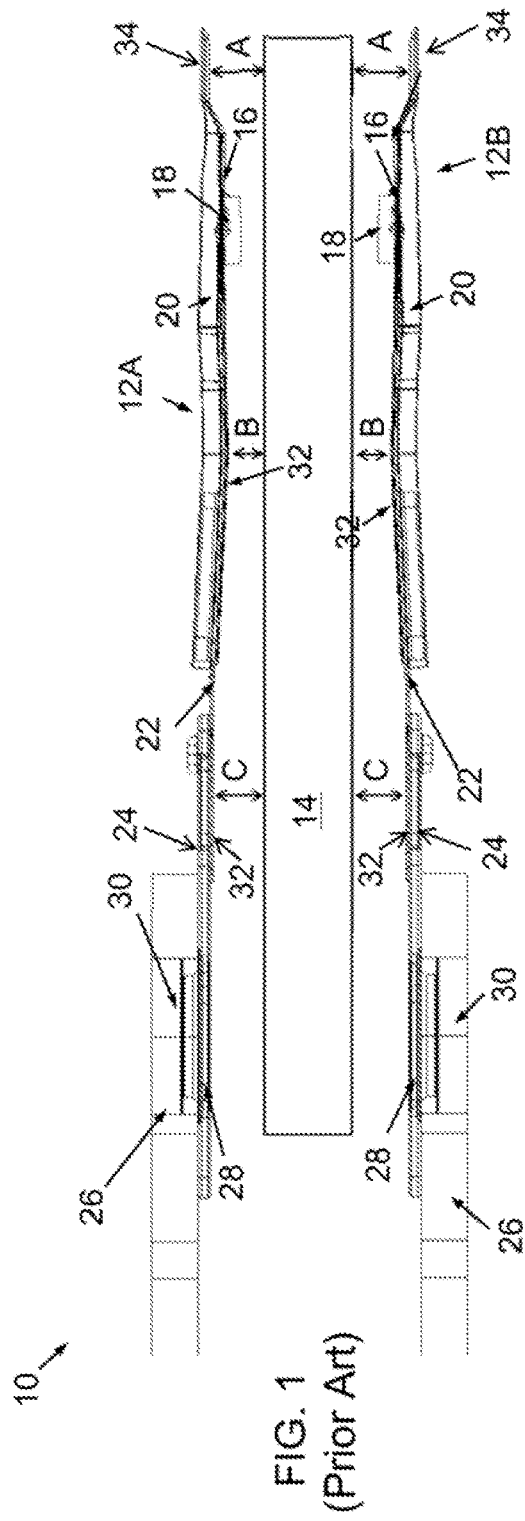
FIG. 1 is a side view of a conventional hard disk drive (HDD) head stack assembly.
Figure 2:
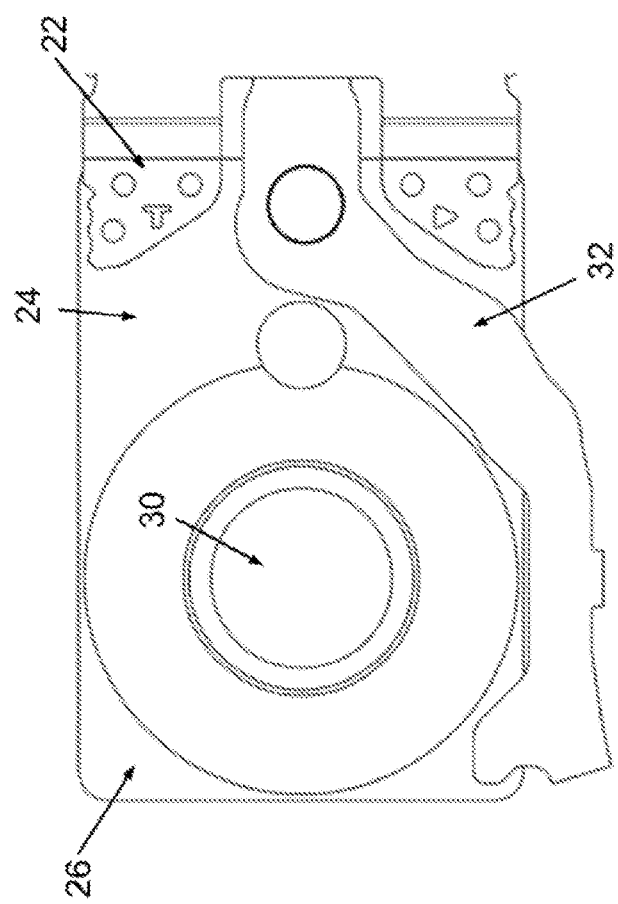
FIG. 2 is a bottom view of the mount plate region of the HDD suspension of FIG. 1.

A circuit 70 (also referred to as a flexure circuit) of wires or conductive traces (that extends to and connects with the slider) extends along indented portions 51c of the first and second ear portions 60, 62, and along the indented portion 51b of the mount plate 50, as shown in FIGS. 3-6. Load beam 74 terminate in a load beam hinge 72 that is mounted to the indented region 51b of the mount plate bottom surface 51. This configuration avoids circuit 70 and load beam hinge 72 from extending along or mounted to the planar region 51a of the mount plate bottom surface 51 (which is not indented). With the bottom surface 51 of mount plate 50 facing the disk 14, this means the mount plate 50 can be positioned closer to the disk 14 while maintaining the same clearance C as compared to the configuration of FIG. 1, because the flexure 70 extends only along indented regions 51b and 51c of bottom surface 51 (which are positioned further away from the upper surface of the disk 14), and because the load beam hinge 72 is mounted to the indented region 51b.

Figure 7:
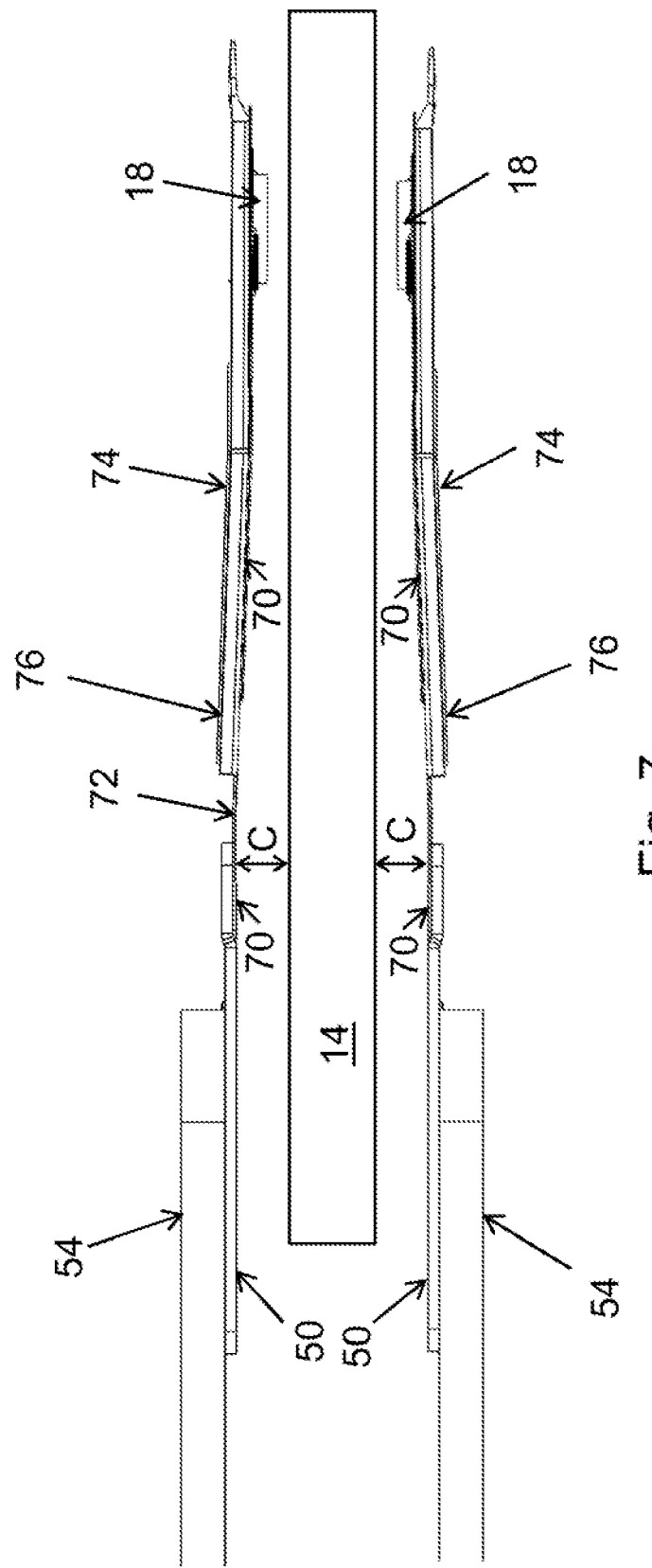
FIG. 7 is a side view of a hard disk drive (HDD) head stack assembly according to the example of the disclosure.

FIG. 7 illustrates a hard disk drive (HDD) head stack assembly with a pair of suspensions 76 that each include the mount plate 50, circuit 70 and load beam 74 as described above. As the slider 18 closely flies over the disk 14 due to the air bearing, the mount plate 50 can bend up and down under the vibration of operation and potentially may contact the disk 14. The mount plate 50 configured as described herein provides sufficient clearance C between the portion of the circuit 70 extending along the mount plate 50 and the disk 14 to help reduce such contact.

FIGS. 8 and 9 illustrate an alternate example, which includes actuators mounted to the indented region 51b. Specifically, the mount plate 50 includes first and second openings 80, 81 extending between the top and bottom surfaces 51/52, and located in the indented region 51b and stepped region 52b. First and second actuators 82, 83 are disposed in the first and second openings 80, 81 respectively. The actuators 82, 83 can be piezoelectric devices, which expand and contract in response to drive signals. The load beam hinge 72 is mounted to a distal portion of the indented region 51b. When one of the actuators 82, 83 expands, it deflects the distal portion of indented region 51b (to which load beam hinge 72 is mounted), thus moving the position of the load beam hinge 72 (and thus the position of the load beam 20 adjacent to the load beam hinge 72). Actuators 82, 83 can be used for high precision positioning of the load beam 20 and the slider 18 mounted thereto (compared to the lower precision positioning of the load beam 20 and slider 18 by the VCM controlled rotation of the stack arm 54).

In this example, the circuit 70 extends along the indented region 51b in-between the openings 80, 81. The configuration of FIGS. 8-9 combines the clearance reducing features of the circuit 70 extending along indented portion 51b (and indented portion 51c located under circuit 70 in FIG. 8), with the high precision positioning using actuators 82, 83 mounted in openings 80, 81 in the indented portion 51b.

It will be understood that terms such as "upper," "lower," "above," "best," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present disclosure" as used herein should not be construed to mean that only a single disclosure having a single essential element or group of elements is presented. Similarly, it will also be appreciated that the term "present disclosure" encompasses a number of separate innovations, which can each be considered separate disclosures. Although the present disclosure has been described in detail with regards to the preferred examples and drawings thereof, it should be apparent to those skilled in the art that various adaptations and modifications of examples of the present disclosure may be accomplished without departing from the spirit and the scope of the disclosure.

We claim:

1. A hard disk drive (HDD) assembly, comprising:
   a disk configured to rotate;
   a stack arm; and
   a suspension connected to the stack arm, wherein the suspension includes:
     a mount plate connected to the stack arm, wherein the mount plate includes a bottom surface facing the disk and an ear portion extending from a side edge of the mount plate, wherein the bottom surface includes:
       a planar region,
       a first indented region vertically recessed relative to the planar region, and
       a second indented region located at the ear portion and vertically recessed relative to the planar region;
     a load beam hinge connected to the first indented region; and
     a circuit extending along the first and second indented regions.

2. The HDD assembly of claim 1, wherein the ear portion includes a plurality of ear portions each including the second indented region along which the circuit extends.

3. The HDD assembly of claim 1, wherein the first indented region is planar, and is parallel to the planar region.

4. The HDD assembly of claim 1, wherein:
   the first indented region is vertically recessed relative to the planar region by an amount of indentation I;
   the second indented region is vertically recessed relative to the planar region by an amount of indentation $I_{ear}$; and
   the amount of indentation I is equal to the amount of indentation $I_{ear}$.

5. The HDD assembly of claim 1, wherein a load beam terminates in the load beam hinge, and wherein the circuit extends along a bottom surface of the load beam hinge and along a bottom surface of the load beam.

6. The HDD assembly of claim 1, wherein the mount plate includes a first opening extending from a top surface of the mount plate to the first indented region of the bottom surface.

7. The HDD assembly of claim 6, further comprising:
   a first actuator disposed in the first opening and configured to deflect a distal portion of the first indented region, wherein the hinge is connected to the distal portion of the first indented region.

8. The HDD assembly of claim 7, wherein the mount plate includes a second opening extending from the top surface of the mount plate to the first indented region of the bottom surface.

9. The HDD assembly of claim 8, further comprising:
   second actuator disposed in the second opening and configured to deflect the distal portion of the first indented region.

10. The HDD assembly of claim 9, wherein the circuit extends along the first indented region and between the first and second openings.

11. A suspension comprising:
    a mount plate that includes a bottom surface and an ear portion extending from a side edge of the mount plate, wherein the bottom surface includes:
      a planar region,
      a first indented region vertically recessed relative to the planar region, and
      a second indented region located at the ear portion and vertically recessed relative to the planar region;
    a load beam hinge connected to the first indented region; and
    a circuit extending along the first and second indented regions.

12. The suspension of claim 11, wherein the ear portion includes a plurality of ear portions each including the second indented region along which the circuit extends.

13. The suspension of claim 11, wherein the first indented region is planar, and is parallel to the planar region.

14. The suspension of claim 11, wherein:
    the first indented region is vertically recessed relative to the planar region by an amount of indentation I;
    the second indented region is vertically recessed relative to the planar region by an amount of indentation $I_{ear}$; and
    the amount of indentation I is equal to the amount of indentation $I_{ear}$.

15. The suspension of claim 11, wherein a load beam terminates in the load beam hinge, and wherein the circuit extends along a bottom surface of the hinge and along a bottom surface of the load beam.

16. The suspension of claim 11, wherein the mount plate includes a first opening extending from a top surface of the mount plate to the first indented region of the bottom surface.

17. The suspension of claim 16, further comprising:
a first actuator disposed in the first opening and configured to deflect a distal portion of the first indented region, wherein the hinge is connected to the distal portion of the first indented region.

18. The suspension of claim 17, wherein the mount plate includes a second opening extending from the top surface of the mount plate to the first indented region of the bottom surface.

19. The suspension of claim 18, further comprising:
second actuator disposed in the second opening and configured to deflect the distal portion of the first indented region.

20. The suspension of claim 19, wherein the circuit extends along the first indented region and between the first and second openings.

* * * * *